Patented Sept. 7, 1937

2,092,425

UNITED STATES PATENT OFFICE 2,092,425

N-ANTHRAQUINONYL AMINO-BENZENE ARSONIC ACID AND PROCESS OF MAKING THE SAME

Fritz Ullmann and Ernst Friedheim, Geneva, Switzerland, assignors to firm of Society of Chemical Industry in Basle, Basel, Switzerland No Drawing. Application December 10, 1935, Serial No. 53,816. In Switzerland December 15, 1934

16 Claims. (Cl. 260—14)

Ehrlich and Bertheim have made 1:2-naphthoquinone-aminobenzenearsonic acid of the formula

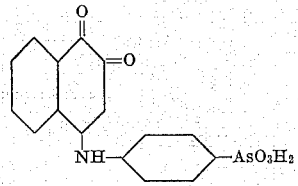

by the action of atoxyl on 1:2-naphthoquinone-sulfonic acid (Berichte der Deutschen Chemischen Gesellschaft, vol. 40 (1907), page 3294). For therapeutic purposes this compound is not applicable, since its administration produces crystalline separations in the kidney and bladder which may lead to dangerous disturbances.

The present invention is based on the observation that by introducing a sulfonic group into a naphthoquinone-aminobenzenearsonic acid or a derivative thereof there may be obtained well-tolerated remedies having a powerful action on trypanosomes. These new compounds pass rapidly into the cerebro-spinal fluid and into the aqueous humor. They have, probably because of their insolubility in lipoids, no toxic effect on the nervous system, such as the simple arsanilic acids have, for example sodium 4-amino-benzene-1-arsonate, sodium 4-acetylamino-benzene-1-arsonate or sodium 2-hydroxy-4-acetylaminobenzene-1-arsonate, which are known to produce bad nervous secondary effects (Fischl, Handbuch der Chemotherapie, pages 386, 405 and 431).

The invention consists in causing a 1:2-naphthoquinone-polysulfonic acid, having one of its sulfo-groups in 4-position, to react with an aminobenzene-arsonic acid or a derivative thereof.

For example, 1:2-naphthoquinone-4:8-disulfonic acid or an acid salt thereof condenses with sodium 4-aminobenzene-1-arsonate in accordance with the following equation:—

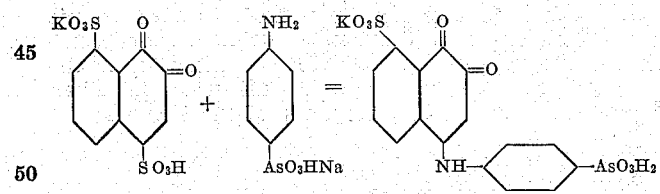 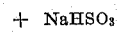

It has been found particularly advantageous to convert the sulfite acid produced during the reaction into a sulfate by addition of an oxidizing agent, particularly hydrogen peroxide or a persalt, such as an alkali persulfate, for in this manner secondary reactions may be prevented.

The new compounds are of therapeutical value.

The following examples illustrate the invention, the parts being by weight:—

Example 1

To a solution of 4.2 parts of 4-aminobenzene-1-arsonic acid in 30 parts of water and 1.5 parts of potassium carbonate are added 8 parts of the acid potassium salt of 1:2-naphthoquinone-4:8-disulfonic acid (obtainable from 2-amino-1-naphthol-4:8-disulphonic acid by oxidizing with bromine). The sulfonic acid dissolves immediately with production of a brown-red color. After half-an-hour there are added 30 parts of a saturated solution of potassium chloride whereby the potassium salt of 1:2-naphthoquinone-4-aminobenzene-4'-arsonic acid-8-sulfonic acid is precipitated in the form of lustrous red laminae; these are filtered and washed first with potassium chloride solution and then with ice-water. The salt is well soluble in water to a red solution, very sparingly soluble in dilute alcohol and insoluble in ether and in benzene. It dissolves in concentrated sulfuric acid to a yellow solution.

From the concentrated aqueous solution of the potassium salt the corresponding alkaline earth salts are precipitated by addition of, for instance, calcium chloride, strontium chloride or magnesium chloride. The calcium salt dissolves freely in aqueous ammonia and in amines. It also dissolves in dilute hydrochloric acid and the free 1:2-naphthoquinone-4-aminobenzene- 4'-arsonic acid-8-sulfonic acid crystallizes from the solution in orange-red needles.

On addition of ferric chloride to the aqueous solution of potassium salt of the new compound there is precipitated a brown-red iron salt, which is insoluble in water; in aqueous ammonia or aliphatic amines or sodium bicarbonate the iron salt dissolves freely to a brown-red solution. The copper salt forms brown-red crystals, insoluble in water and soluble in ammonia to a yellow solution.

Example 2

Into a solution of 10.8 parts of 4-aminobenzene-1-arsonic acid in 4.5 parts of sodium bicarbonate and 125 parts of water there are introduced, at about 15° C., 20 parts of sodium 1:2-naphthoquinone-4:8-disulfonate. The mixture is cooled below 5° C. and at this temperature there is added gradually a mixture of 12.5 parts of hydrogen peroxide of 30 per cent. strength and ice. Soon the sodium salt of 1:2-naphthoquinone-4-aminobenzene-4'-arsonic acid-8-sulfonic acid begins to separate in the form of red laminae. It is salted out by addition of sodium chloride, filtered, washer with sodium chloride solution and dried. Other salts, such as for instance the iron or copper salts are prepared as described in Example 1.

Example 3

2 parts of 4-hydroxy-3-aminobenzene-1-arsonic acid and 8 parts of sodium bicarbonate are dissolved together in the heat in 200 parts of sodium chloride solution of 30 per cent. strength and, after cooling, 20 parts of potassium 1:2-naphthoquinone-4:8-disulfonate are introduced, while stirring, whereupon the potassium salt dissolves immediately to a brown-red solution. After a short time the condensation product separates in the form of brown violet crystals. After 3-4 hours these are filtered and washed with sodium chloride solution. The salt dissolves very freely in water to a brown-red solution; on adding calcium chloride to the concentrated aqueous solution there is precipitated an insoluble red crystalline calcium salt, which is insoluble in water and alcohol. In aqueous ammonia or amines it dissolves to a red-brown solution. By rubbing the calcium salt with dilute hydrochloric acid it may be completely dissolved and after a short time there crystallizes the free sulfonic acid of the formula

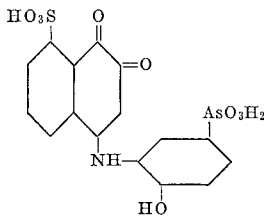

in the form of orange red needles. These are very easily soluble in water and sparingly in alcohol but insoluble in acetone. After addition of potassium chloride solution to the aqueous solution of the sulfonic acid the potassium salt, which is very sparingly soluble, separates in the form of red crystals. The latter dissolve in concentrated sulfuric acid to a yellow solution. Other salts, such as for instance the iron or copper salts are prepared as described in Example 1.

Example 4

To a solution of 10 parts of 4-aminobenzene-1-arsonic acid in 6 parts of sodium bicarbonate and 80 parts of water are added 20 parts of potassium 1:2-naphthoquinone-4:6-disulfonate (Berichte der Deutschen Chemischen Gesellschaft, vol. 27 (1894), page 3052), whereupon this salt is dissolved with production of a brown-red color. When the color no longer deepens the mass is acidified with acetic acid and the red solution is mixed with 100 parts of saturated potassium chloride solution. From the clear solution there separate, after a short time, red scales; these are filtered and washed first with potassium chloride solution and then with a little water. The acid potassium salt of 1:2-naphthoquinone-4-aminobenzene-4'-arsonic acid-6-sulfonic acid thus obtained dissolves in water to a brown solution. It is insoluble in ether, benzene and absolute alcohol; it colors concentrated sulfuric acid yellow.

The following compounds have been produced in analogous manner:—1:2-naphthoquinone-4-aminobenzene-3'-hydroxy-4'-arsonic acid-8-sulfonic acid, 1:2-naphthoquinone-4-aminobenzene-2'-hydroxy-4'-arsonic acid-8-sulfonic acid, 1:2-naphthoquinone-4-aminobenzene-2'-arsonic acid-8-sulfonic acid, 1:2-naphthoquinone-4-aminobenzene-2'-amino-4'-arsonic acid-8-sulfonic acid, 1:2-naphthoquinone-4-aminobenzene-2'-hydroxy-5'-arsonic acid-6-sulfonic acid, 1:2-naphthoquinone-4-aminobenzene-4'-arsonic acid-7-sulfonic acid, 1:2-naphthoquinone-4-aminobenzene-2'-hydroxy-5'-arsonic acid-7-sulfonic acid, 1:2-naphthoquinone-4-aminobenzene-3'-hydroxy-4'-arsonic acid-6:8-disulfonic acid, 1:2-naphthoquinone-4-aminobenzene-4'-arsonic acid-6:8-disulfonic acid, as well as the salts of the above named compounds.

The parent products necessary for producing these compounds can be obtained as follows:—1:2-naphthoquinone-4:7-disulfonic acid according to Böniger (Berichte der Deutschen Chemischen Gesellschaft, vol. 27, page 3054, 1894), 1:2-naphthoquinone-4:6:8-trisulfonic acid by converting β-naphthol-6:8-disulfonic acid into 1-amino-2-hydroxynaphthalene-6:8-disulfonic acid, sulfonating this compound in 4-position and subsequently oxidizing the same.

What we claim is:—

1. A process for the manufacture of arsenic compounds of the naphthoquinone series comprising reacting an alkali metal salt of a 1:2-naphthoquinone-polysulfonic acid having a sulfo-group in 4-position with an alkali metal salt of an aminobenzene arsonic acid.

2. A process for the manufacture of arsenic compounds of the naphthoquinone series comprising reacting an alkali metal salt of 1:2-naphthoquinone-4:8-disulfonic acid with an alkali metal salt of an aminobenzene-arsonic acid.

3. A process for the manufacture of arsenic compounds of the naphthoquinone series comprising reacting an alkali metal salt of 1:2-naphthoquinone-4:6-disulfonic acid with an alkali metal salt of an aminobenzene-arsonic acid.

4. A process for the manufacture of arsenic compounds of the naphthoquinone series comprising reacting an alkali metal salt of 1:2-naphthoquinone-4:8-disulfonic acid with an alkali metal salt of the compound of the formula

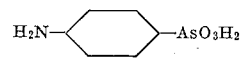

5. A process for the manufacture of arsenic compounds of the naphthoquinone series comprising reacting an alkali metal salt of 1:2-naphthoquinone-4:8-disulfonic acid with an alkali metal salt of the compound of the formula

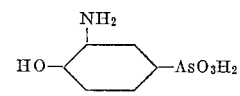

6. A process for the manufacture of arsenic compounds of the naphthoquinone series comprising reacting an alkali metal salt of 1:2-naphthoquinone-4:6-disulfonic acid with an alkali metal salt of the compound of the formula

7. The process set forth in claim 1, said reaction being effected in the presence of an oxidizing agent.
8. The process set forth in claim 1, said reaction being effected in the presence of hydrogen peroxide.
9. The process set forth in claim 1, said reaction being effected in the presence of a per-salt.
10. The process set forth in claim 1, said reaction being effected in the presence of a per-sulfate.
11. A 1:2-naphthoquinone - 4 - aminobenzene-arsonic acid having at least one sulfonic acid radical in the naphthoquinone nucleus.
12. A 1:2-naphthoquinone - 4 - aminobenzene-arsonic-acid-8-sulfonic acid.
13. A 1:2-naphthoquinone-4-aminobenzene-arsonic-acid-6-sulfonic acid.
14. A compound of the formula

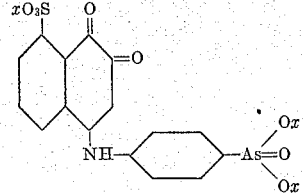

wherein $x$ represents a member of the group consisting of hydrogen and metal.
15. A compound of the formula

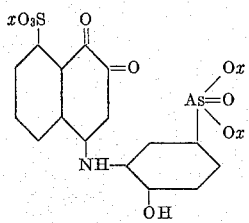

wherein $x$ represents a member of the group consisting of hydrogen and metal.
16. A compound of the formula

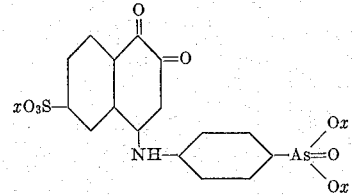

wherein $x$ represents a member of the group consisting of hydrogen and metal.

FRITZ ULLMANN.
ERNST FRIEDHEIM.

CERTIFICATE OF CORRECTION.

Patent No. 2,092,425. September 7, 1937.

FRITZ ULLMANN, ET AL.

It is hereby certified that error appears in the above numbered patent requiring correction as follows: In the grant, line 6, and in the heading to the printed specification, line 2, title of invention, for the words "N-ANTHRAQUINONYL AMINO-BENZENE" read NAPHTHOQUINONE AMINO-BENZENE; and that the said Letters Patent should be read with this correction therein that the same may conform to the record of the case in the Patent Office.

Signed and sealed this 30th day of August, A. D. 1938.

Henry Van Arsdale (Seal) Acting Commissioner of Patents.